(12) United States Patent
Robles Hernandez et al.

(10) Patent No.: US 7,559,999 B2
(45) Date of Patent: Jul. 14, 2009

(54) RAILROAD WHEEL STEELS HAVING IMPROVED RESISTANCE TO ROLLING CONTACT FATIGUE

(75) Inventors: Francisco C. Robles Hernandez, Pueblo, CO (US); Daniel Hunter Stone, Pueblo West, CO (US)

(73) Assignee: Transportation Technology Center, Inc., Pueblo, CO (US)

( * ) Notice: Subject to any disclaimer, the term of this patent is extended or adjusted under 35 U.S.C. 154(b) by 0 days.

(21) Appl. No.: 11/843,770

(22) Filed: Aug. 23, 2007

(65) Prior Publication Data

US 2009/0051182 A1 Feb. 26, 2009

(51) Int. Cl.
*C22C 38/48* (2006.01)
*B60B 17/00* (2006.01)

(52) U.S. Cl. .................... 148/335; 148/336; 295/30

(58) Field of Classification Search .............. 295/1, 295/21, 24, 25, 26, 27, 29, 30; 148/306, 148/307, 320, 333–336, 581, 583
See application file for complete search history.

(56) References Cited

U.S. PATENT DOCUMENTS

| | | | |
|---|---|---|---|
| 2,041,635 A | 5/1936 | Buchholtz | |
| 4,822,556 A * | 4/1989 | Cordea et al. | 420/59 |
| 4,895,605 A * | 1/1990 | Ackert et al. | 148/541 |
| 5,645,653 A * | 7/1997 | Jerath et al. | 148/320 |
| 5,661,219 A * | 8/1997 | Nakane et al. | 525/166 |
| 5,899,516 A | 5/1999 | Fujimura et al. | |
| 5,900,082 A * | 5/1999 | Hewitt | 148/664 |
| 6,372,057 B1 * | 4/2002 | Fujimura et al. | 148/333 |
| 6,387,191 B1 | 5/2002 | Stone et al. | |
| 6,663,727 B2 * | 12/2003 | Fujimura et al. | 148/336 |
| 6,783,610 B2 | 8/2004 | Shirley et al. | |
| 2002/0074065 A1 * | 6/2002 | Fujimura et al. | 148/320 |
| 2003/0024608 A1 * | 2/2003 | Cooper | 148/321 |
| 2006/0266447 A1 * | 11/2006 | Cooper | 148/543 |
| 2008/0217321 A1 * | 9/2008 | Vinegar et al. | 219/492 |

OTHER PUBLICATIONS

Dr. Edgar C. Bain, Functions of the Alloying Elements in Steel, Twenty-First National Metal Congress and Exposition, Oct. 1939, p. 4, American Society of Metal, Cleveland, Ohio.
steel. 2007 [online], [retrieved on Aug. 23, 2007]. Retrieved from Encyclopaedia Britannica Online using Internet <URL:http://www.britannica.com/eb/article-81457/steel>.

* cited by examiner

*Primary Examiner*—Russell D Stormer
(74) *Attorney, Agent, or Firm*—Dorr, Carson & Birney, P.C.

(57) ABSTRACT

Steels having a pearlitic structure and containing 0.65 to 0.80 weight percent carbon, 0.90 to 1.10 weight percent silicon, 0.85 to 1.15 weight percent manganese, 0.001 to 0.030 weight percent phosphorus, 0.009 to 0.013 weight percent niobium, 0.05 to 0.15 nickel, 0.20 to 0.30 weight percent molybdenum, 0.10 to 0.30 weight percent vanadium and 0.005 to 0.040 weight percent sulfur with the remainder of said steel being iron and incidental impurities, can be used to make railway wheels that are particularly resistant to rolling contact fatigue and, hence, shelling.

4 Claims, 2 Drawing Sheets

Grain Size: 50 microns
Austenitisation: 950.0 °C

RAILROAD WHEEL STEELS HAVING IMPROVED RESISTANCE TO ROLLING CONTACT FATIGUE

BACKGROUND OF THE INVENTION

1. Field of the Invention

The present invention generally relates to railroad wheel steels. More particularly, it is concerned with those railroad wheel steels that are alloyed and/or heat treated to resist both wear and thermo-mechanical deterioration, especially in the tread (and/or flange) regions of such wheels. The terms "spalling" and "shelling" are widely used in describing such thermo-mechanical deterioration. Spalling generally refers to loss of wheel tread material as a result of metallurgical damage created by excessive heat that results from sliding of railroad wheels during train braking operations. Shelling generally refers to loss of wheel tread material as a result of deterioration arising from mechanical stresses.

Various problems arise from each form of tread material loss. By way of example only, thermo-generated deterioration of a railroad wheel's tread can quickly create flat spots on the wheel's outer surface and thereby produce the undesired quality known as "out-of-roundness". Moreover, when railway wheels experience thermo-engendered deterioration, surface cracks tend to propagate from such deteriorated areas and cause potentially dangerous defects in contiguous wheel regions. Similar surface cracks are also created as a result of relatively slower mechanically generated deterioration. Aside from their catastrophic accident causing potentials, wheel defects such as these are also known to increase wheel/rail dynamic forces that produce consequential damage such as broken rails and accelerated track deterioration. The railroad industry is therefore constantly looking for ways to minimize every aspect of thermo-mechanical deterioration of railroad wheels while still preserving, as far as possible, their wear resistance qualities.

2. Description of the Prior Art

Re: Thermo Aspects of Thermo-Mechanical Deterioration

Steel railroad wheels eventually wear out as a result of normal usage. Such wheels are however often prematurely forced from service as a result of various forms of thermo-mechanical deterioration. A great deal of the thermo aspect of thermo-mechanical deterioration results from metallurgical transformation of a railroad wheel's tread/flange steel from its original, relatively tough, pearlitic structure to more brittle structures such as austenite, bainite and/or martensite—with attendant loss of the austenite/bainite/martensite materials through spalling. Again, thermo deterioration is caused by the heat generated by friction when a train's wheels skid during braking operations. That is to say that brittle steel materials are produced when such frictional heat is sufficient to raise tread/flange temperatures to austenite that is then transformed to bainite, but in most cases martensite. These hot spots generally range from about the size of a U.S. ten cent piece to about the size of a U.S. twenty five cent piece. This heating can occur in time periods as short as one second; indeed it can occur in time periods of less than one thousandth of a second. Thereafter, because the rest of the railway wheel serves as a heat sink, these very high hot spot temperatures are quickly lowered. Thus, in skid producing braking situations, local areas of the tread and/or flange are transformed to austenite, bainite and/or martensite as their steel material rapidly heats—and then rapidly cools.

Those skilled in this art also will appreciate that a martensite transformation progresses only while the steel is cooling (that is to say that more and more discrete volumes of a parent austenite solid solution transform as the steel cools). Martensite transformations can be prevented if the cooling process is interrupted at a temperature above the so-called "Start Martensite." Moreover, the amount of martensite formed per degree of decrease in temperature is not a constant (i.e., the number of martensite crystalline units produced at first is small, but increases rapidly as the temperature continues to decrease). In any case, the resulting brittle martensite material then tends to crack and fall away from the wheel.

Re: Mechanical Aspects of Thermo-Mechanical Deterioration

The mechanical aspects of thermal-mechanical deterioration is often referred to as "rolling contact fatigue." Again, it produces the undesired form of steel material loss known as "shelling." Here, the rolling action of a steel wheel produces cyclical mechanical stresses that—in their own right—can contribute to a railway wheel's deterioration. That is to say that rolling contact fatigue can occur even if the tread steel does not experience metallographic changing temperatures. Rolling contact fatigue is generally caused by diminished shear fatigue strength of the wheel's tread surface steel. This form of fatigue is usually considered in conjunction with the level of subsurface shear stress being applied to a wheel, especially in the region just below the tread's rail contact surface. In any case, rolling contact fatigue is related to both the strength of the wheel tread surface and to the load applied to it. And, as previously noted, the strength of the wheel tread surface steel is, in turn, related to its hardness.

Freight car wheels are often called upon to carry out especially severe duties. For example freight car wheels are frequently subjected to local contact pressures in excess of 160,000 p.s.i. These relatively greater loads lead directly to higher levels of rolling contact fatigue. Such wheels must therefore be made from relatively hard steels in order to impart acceptable wear life characteristics under such loads. The use of hard steels notwithstanding, railroads are experiencing an increasing incidence of shelling type defects in freight car wheels as a result of the greater loads they are currently being called upon to carry. It should also be appreciated that these greater wheel loads are produced by driving forces as well as by normal loads. Driving forces tend to cause cracks in a wheel's flange regions while normal loads tend to cause shelling of the tread.

Freight car wheels also must function as brake drums. Consequently, even during normal braking operations, they must act as heat sinks to dissipate the energy created by such braking operations. When train brakes are applied the frictional heating between a wheel and its shoe can easily produce tread temperatures of over 1000° F. If brake heating raises to substantially higher levels, the stresses produced can exceed the yield strength of the wheel's steel. Moreover, when brake heated wheels again cool, residual tensile stresses may remain therein and subsequently serve to open any surface cracks that may be present. It is therefore not surprising that the phenomenon of shelling due to rolling contact fatigue is much more pronounced in heavily loaded freight car wheels that travel over long and steep grades, e.g., in mountainous regions, where a train's brakes are much more heavily employed.

Re: Intimate Relationships Between Thermo and Mechanical Deterioration

Next, it should be specifically noted that rolling contact fatigue often occurs in intimate conjunction with the thermo aspects of thermo-mechanical deterioration. For example, elevated temperatures in a wheel steel serve to reduce its ability to resist mechanical loading owing to the steel's diminished mechanical strength above certain temperatures.

Moreover, the longer a wheel steel experiences elevated temperatures and high levels, the greater the degree of shelling that will result from this time related circumstance. Thus, in formulating steels resistant to wear, thermo deterioration and/or mechanical deterioration, one must bear in mind that these phenomena are very often intimately related.

Re: The Wear Resistance vs. Thermo-Mechanical Deterioration Dilemma

Ideally, a steel from which railway wheels are made would simultaneously have high levels of the three general properties previously described. That is to say that they would be highly wear resistant, highly resistant to thermo-generated deterioration and highly resistant to mechanical deterioration. Unfortunately, to varying degrees, these properties range from being metallurgically antagonistic to being metallurgically incompatible. For example, increased hardness in a steel usually implies decreased resistance to thermo-generated deterioration. Conversely, when a steel is alloyed to be more resistant to thermo-generated deterioration, this usually implies that the steel will be less hard, and hence, inherently less wear resistant.

Those skilled in this art will also appreciate that the ability of a given alloying element to create and/or stabilize certain metallographic phases may be of great importance. Indeed, many steel alloying elements are categorized around this concept. For example, chromium, nickel and manganese are often referred to as austenite-forming elements. Chromium, silicon, molybdenum, tungsten and aluminum are frequently referred to as ferrite-forming elements. Another group of elements known as carbide-forming elements includes chromium, tungsten, molybdenum, vanadium, titanium, niobium, tantalum and zirconium. In most cases however, any given desired resistance to thermo-mechanical deterioration through the use of alloys must be considered in the context of the degree of sacrifice of a steel's pearlitic structure that will be caused by the specific alloying elements employed. This remains a very important consideration because a pearlitic structure serves to impart the quality of wear resistance to steel railway wheels.

Re: Teachings of the Literature

The technical and patent literature reveals that many alloying materials have been added to (or, in the case of carbon, taken from) a host of railroad wheel steel formulations for the purposes of striking a balance between imparting hardness (and hence wear resistance) to a steel and imparting resistance to thermo-mechanical deterioration. By way of general example only, it is well known that in situations where wear resistance is the more desired property, high carbon steels having carbon contents ranging from about 0.65 to about 1.0 weight percent are preferred. Such steels are especially hard and, hence, especially wear resistant. Such steels are not, however, particularly resistant to thermo-mechanical deterioration. Conversely, it is also well known that medium carbon steels having carbon contents ranging from about 0.45 to about 0.55 weight percent are more thermo deterioration resistant than harder steels, but are generally less wear resistant. It is also common knowledge that virtually all other steel alloying elements (other than carbon) tend to produce decreased wear resistance in railroad wheels as their concentrations are increased.

The technical literature also shows that it has been a long standing custom to consider steel alloying elements in terms of the properties they confer upon a steel (e.g., chromium makes a steel hard, nickel and manganese make it tough, and so on). It should be appreciated however that some of these custom based statements can lead to misunderstandings. For example, when a statement to the effect "chromium makes a steel hard, and hence, wear-resistant," is encountered, one should realize that author of such a statement probably has in mind a steel having a relatively high (e.g., 1.2%) carbon concentration and a relatively high (e.g., 2.0%) chromium concentration. If, however, a steel contained the same 2.0% chromium concentration—but only a 0.10% carbon concentration—the hardness of that steel would be considerably lower than that of the 1.2% carbon, 2.0% chromium steel. Similarly, if a statement to the effect that "manganese makes a steel tough" is encountered, one should realize that the author of such a statement probably has a steel with a high (e.g., 13%) manganese concentration in mind because, in fact, steels containing lower manganese concentrations (e.g., 1.0% to 5.0% manganese), especially in conjunction with other alloys, can have relatively higher levels of toughness.

This all goes to say that the wear resistance versus thermo-mechanical resistance problem has a persistent dilemmatic quality that continues to thwart the railroad industry's attempts to extend the useful life of railway wheels. It also should be noted that railroad wheel steel designers have long accepted that thermo-engendered deterioration is the more intractable aspect of the wear resistance versus thermo-mechanical deterioration resistance dilemma. Aside from economic considerations, this acceptance generally follows from the fact that normal wear is somewhat predictable, and gradual, in nature. Heat producing wheel skids on the other hand are relatively unpredictable. Worse yet, thermo-generated deterioration tends to produce damage that is much more immediate and much more severe in nature. Nonetheless, most railway wheel steel compositions are still designed toward trying to (for economic reasons) satisfy railroad industry requirements for greater wear resistance, while "silently" conceding that thermo deterioration due to wheel skids, and/or mechanical deterioration in its own right, will be dealt with by: (1) physically machining railway wheel tread/flange regions on a scheduled basis to meet mandated wheel flange dimensions, or (2) by machining heavily spalled wheels on an "as needed" basis, or (3) by simply scrapping more heavily damaged wheels.

Re: Theoretical Considerations

Thus far, alloying theories have been of somewhat limited value in dealing with the wear resistance vs. thermo-mechanical deterioration dilemma. For example, even though the constitution of three component steels can theoretically be deduced from ternary phase diagrams, they are often rather difficult to interpret. Their practical value is also limited by the fact that they only describe equilibrium conditions. Therefore, since most modern railroad wheel steels are both heat treated during their manufacture and contain more than three alloying components, much more complex graphing methods (e.g., Temperature Time Transformation diagrams) must be employed and interpreted—thus far with varying degrees of success as far as railroad wheel steels are concerned.

Indeed, it seems fair to say that even though modern steel metallurgy is a highly skilled and scientific art, it nonetheless, has certain elements of empiricism in some circumstances wherein even relatively minor changes in the identity and/or relative concentrations of any given alloying element can potentially make very significant changes in the resulting properties of a given steel. Further complexities arise from various heat treatment processes to which these steels are usually exposed. These competing considerations are very nicely summarized by Dr. Edgar C. Bain on page 4 of his now somewhat dated, but still very highly regarded, work on this subject: "Functions of the Alloying Elements in Steel." There, he said:

"The author has been forced to conclude that it is unproductive to attempt to correlate systematically ultimate mechanical properties directly with the presence of the several common alloying elements without considering the proportion of the element, the carbon content, and above all, the heat-treatment employed and the final structure. Thus, it would seem almost misleading to say, without qualification, that any certain element contributes, for example, hardness and toughness to steels without stating in what composition and after which treatment. It is now established that an element does not, merely by its auspicious presence alone, contribute a property, as sugar lends sweetness, without regard for the structure favored by the element under specific circumstances."

This concession to empiricism has not changed much over the years since Dr. Bain's work was published. For example, in discussing the alloying of steels, the Encyclopedia Britannica Online makes a much more up-to-date concession to steel alloying empiricism with the statement:

"Alloying elements are added to steel in order to improve specific properties such as strength, wear, and corrosion resistance. Although theories of alloying have been developed, most commercial alloy steels have been developed by an experimental approach with occasional inspired guesses."

The patent literature also reflects the railway industry's attempts to deal with the wear resistance vs. thermo-mechanical deterioration dilemma. For example. U.S. Pat. No. 6,783,610 ("the '610 patent") discloses two distinct railroad wheel steels. The first is comprised of 0.67 to 0.77 wt. % carbon, 0.65 to 0.85 wt. % silicon, 0.70 to 0.85 wt. % manganese, less than 0.025 wt. % phosphorous, 0.18 to 0.25 wt. % chromium, 0.08 to 0.12 wt. % molybdenum, and less than 0.025 wt. % sulfur. The second steel is comprised of 0.16 to 0.45 wt. % carbon, 0.50 to 0.70 wt. % silicon, 0.90 to 1.10 wt. % manganese, less than 0.035 wt. % phosphorous, 0.40 to 0.60 wt. % chromium, 1.0 to 1.5 wt. % nickel, 0.40 to 0.60 wt. % molybdenum and less than 0.035 wt. % sulfur. These railroad wheel steels are intended to thwart various forms of thermo-mechanical deterioration. For example, the '610 patent disclosure teaches that its steel's molybdenum and chromium components will serve to increase the minimum temperature at which fatigue cracks will occur. This in turn will decrease the time the tread steel is above a given critical temperature. It is also noted in this patent disclosure that the mechanical portion of the thermal-mechanical deterioration process derives largely from rolling contact fatigue which is exacerbated by increased wheel loads and travel speeds. Moreover, the '610 patent describes several intimate relationships between rolling contact fatigue and various heat considerations; e.g., the effects of thermal stresses, reduced steel strength at elevated temperatures and time-at-temperature considerations.

The differences between the alloyed steels taught in the '610 patent and the alloyed steels disclosed in Applicants' patent disclosure are as follows. Applicants employ niobium while the '610 patent does not. Moreover, the nickel concentration ranges of the respective patent disclosures do not overlap. Applicants' second steel employs 0.20 to 0.30 wt. % molybdenum while the '610 patent teaches use of 0.08 to 0.12 wt. % or 0.40 to 0.60 wt. % molybdenum. Finally, Applicants' second steel employs vanadium while and the '610 patent's steels do not.

U.S. Pat. Nos. 6,372,057 and 6,663,727 ("the Fujimura, et al. patents") each teach pearlitic steel railroad wheel steels whose less complex compositions contain 0.40 to 0.77 wt. % carbon, 0.40 to 1.20 wt. % silicon, 0.40 to 1.20 wt. % manganese, 0.003 to 0.060 wt. % aluminum, up to 0.0030 wt. % oxygen (and preferably between 0.0005 to 0.0030 wt. % oxygen) with the balance being iron and trace impurities. These patents also disclose more complex steel compositions having 0.40 to 0.77 wt. % carbon, 0.25 to 0.60 wt. % silicon, 0.40 to 1.20 wt. % manganese, up to 0.030 wt. % phosphorous, up to 0.35 wt. % chromium, up to 0.10 wt. % niobium, up to 0.15 wt. % nickel, up to 0.10 wt. % molybdenum, up to 0.10 wt. % vanadium, 0.005 to 0.030 wt. % sulfur, 0.003 to 0.060 wt. % aluminum, up to 0.003 wt. % oxygen, up to 0.35 wt. % copper, up to 0.015 wt. % nitrogen, up to 0.005 wt. % boron, up to 0.10 wt. % titanium, up to 0.0050 wt. % calcium and up to 0.00025 wt. % hydrogen. These steels were primarily formulated to prevent the phenomenon known as "shattered-rim fracture" which stems from internal defects in the wheel steel such as inclusions, pores, voids, cavities, pinholes and the like.

There are many differences between the alloying ingredients (and/or their concentrations) employed by Applicants and those taught by Fujimura, et al. For example, one of Applicants' alloys employs 0.20 to 0.30 wt. % molybdenum while Fujimura, et al. teach use of only up to 0.10 molybdenum. More importantly the Fujimura, et al. references teach the use of aluminum, oxygen, copper, nitrogen, boron, titanium, calcium and hydrogen to alloy their steels while Applicants use none of these elements.

U.S. Pat. No. 6,387,191 ("the '191 patent") teaches pearlitic railroad wheel steels having 0.60 to 1.0 wt. % carbon, 1.1 to 3.0 wt. % silicon, 0.45 to 0.85 wt. % manganese, 0.50 to 1.0 wt. % chromium and less than 0.050 wt. % sulfur. These steels are especially resistant to martensite transformations, and hence spalling. The addition of their chromium component makes them particularly resistant to such spalling. Applicants' present railroad wheel steels differ from those taught in the '191 patent in several respects. For example, Applicants' present invention employs niobium, nickel, molybdenum and vanadium while the steels described in the '191 patent do not.

U.S. Pat. No. 5,899,516 teaches that pearlitic steels having 0.40 to 0.75 wt. % carbon, 0.40 to 0.95 wt. % silicon, 0.6 to 1.20 wt. % manganese, less than 0.030 wt. % phosphorous, less than 0.20 wt. % chromium, up to 0.1 wt. % nickel, less than 0.03 wt. % sulfur and 0.25 to 1.0 wt. % copper have both wear resistance and heat-crack resistance. The pearlitic structure of these steels should be at least 50 mm in depth from the tread surface. In order to attain this, a particular quenching process also is taught in this patent disclosure. More specifically, the '516 patent teaches interruption of its cooling operation after the steel's cooling curve has passed through its pearlite transformation region, but before said curve descends to the steel's martensite transformation region. Thus, the steels taught by the '516 patent are given fine pearlitic structures and nicely avoid martensitic transformation conditions that might otherwise be encountered during the manufacture of these steels—and the wheels made from them. Unfortunately, however, many martensite transformation conditions produced by the heat generated by heavy braking conditions do not coincide with the martensite transformation conditions that can be avoided in highly controlled manufacturing processes such as those disclosed in the '516 patent. As far as differences in alloying materials are concerned, Applicants employ niobium while the '516 patent disclosure does not teach their use.

U.S. Pat. No. 2,041,635 ("the '635 patent") teaches that railroad wheel steels having 0.05 to 0.20 wt. % carbon, 0.1 to 0.6 wt. % silicon, 0.6 to 1.6 wt. % manganese, 0.08 to 0.25 wt. % phosphorous and 0.25 to 1.0 wt. % copper can be improved upon with respect to their wear resistance and shock resistance by inclusion of up to 1.5% chromium in said steels. As far as alloying element differences are concerned, Applicants employ chromium, niobium, nickel, molybdenum and vanadium. These elements are not mentioned in the '635 patent. Moreover, Applicants do not use the copper component taught by the '635 patent.

In closing their comments on the prior art, Applicants would say that even though a great deal has been learned about rolling contact fatigue, the fact remains that such fatigue is still responsible for a significant part of the accelerated wear of railway wheels in general, and freight car wheels in particular, through shelling of their tread/flange regions. Indeed, rolling contact fatigue problems are becoming more and more pronounced as freight cars are increasingly being called upon to carry maximum allowable loads. It is therefore an object of this invention to provide steels for railway wheels that have increased resistance to rolling contact fatigue (and hence shelling) by virtue of their particular alloy formulations—without unduly sacrificing their wear resistant and thermo deterioration resistant qualities.

SUMMARY OF THE INVENTION

Figure 1:
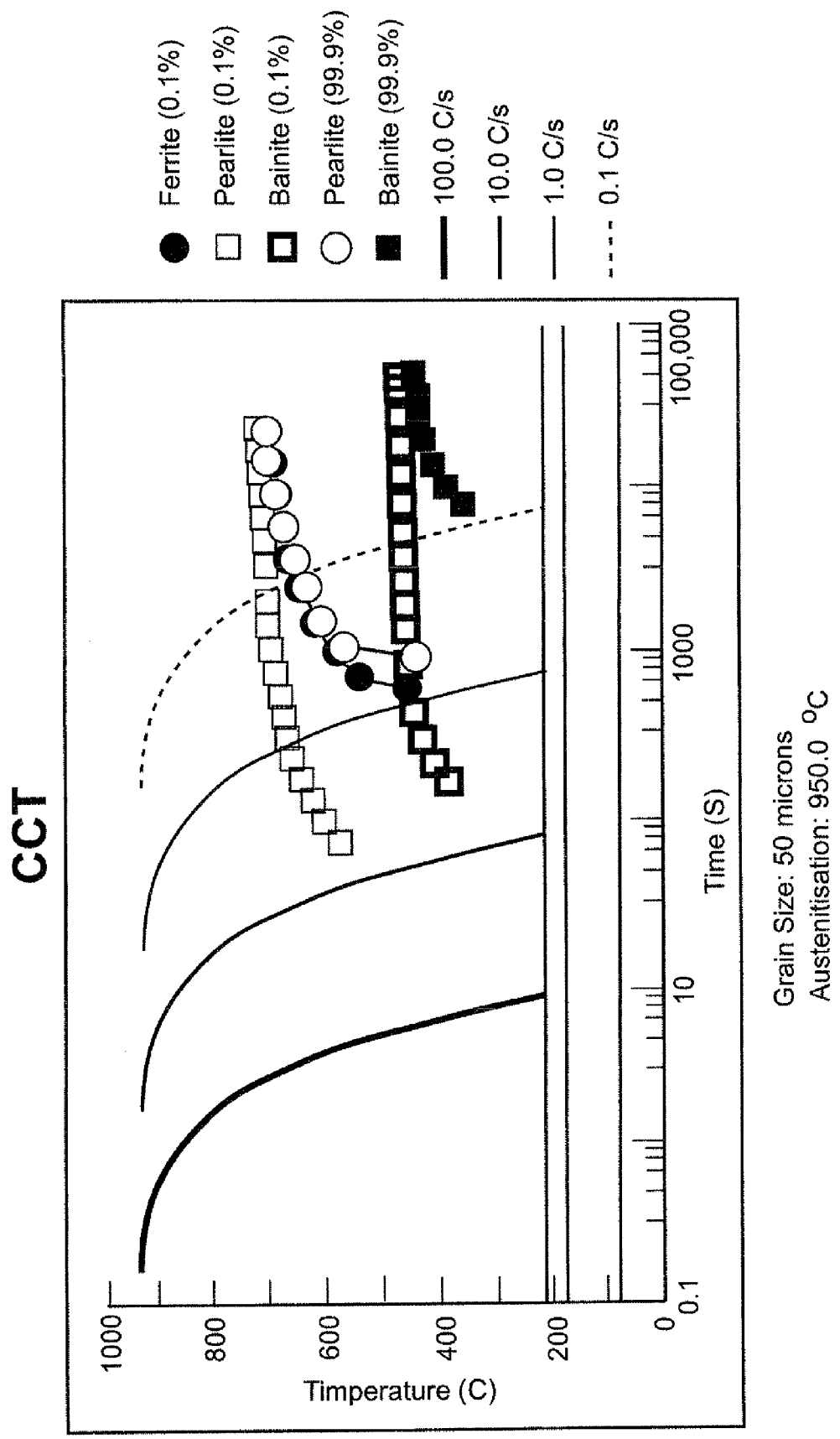
FIG. 1 is a continuous cooling transformation (CCT) diagram for a representative steel of this patent disclosure.

Steel alloys characterized by their pearlitic microstructures and having the formulations given below can be used to make railway wheels that are particularly resistant to rolling contact fatigue—and hence shelling. It also should be understood that various physical treatments of the steels having the formulations described in this patent disclosure may be employed during a wheel's manufacture in order to improve its metallurgical properties. Such physical operations may include casting, forging, quenching, hot working, cold working and the like. It also should be appreciated that these physical operations may be more specifically directed at the tread and/or flange regions of a railroad wheel. Moreover such steels and such physical operations may be specifically directed toward a wheel's rim region or toward a separate and distinct rim component of a railway wheel.

Applicants' first railroad wheel steel has a pearlitic structure and is comprised of:
  0.65 to 0.80 wt. % carbon;
  0.90 to 1.10 wt. % silicon;
  0.85 to 1.15 wt. % manganese;
  0.001 to 0.030 wt. % phosphorus;
  0.009 to 0.013 wt % niobium;
  0.005 to 0.040 wt. % sulfur;
with the balance being iron and incidental impurities.

Applicant's second railroad wheel steel also has a pearlitic structure and is comprised of:
  0.65 to 0.80 wt. % carbon;
  0.80 to 1.00 wt. % silicon
  0.85 to 1.15 wt. % manganese;
  0.005 to 0.030 wt. % phosphorous;
  0.10 to 0.25 wt. % chromium;
  0.01 to 0.12 wt. % niobium;
  0.050 to 0.150 wt. % nickel;
  0.20 to 0.30 wt. % molybdenum;
  0.10 to 0.30 wt. % vanadium;
  0.005 to 0.040 wt. % sulfur;
with the balance being iron and incidental impurities.

DETAILED DESCRIPTION OF THE INVENTION

Applicants have found that the presence of niobium (Nb) in most of the steel formulations of this patent disclosure is usually an especially significant factor in achieving the ends of this invention. That is to say that Applicants have found that niobium is a particularly good grain refiner for these steels and that this grain refinement results in significant improvement in the mechanical properties (e.g., hardness and tensile properties) of these steels. Applicants also have found that the niobium component of these steels acts as a particularly effective austenite stabilizer. This, in turn, serves to prevent formation of a martensite phase—and hence spalling of these steels. Another key point with respect to the presence of niobium in these steels is that a pearlitic transformation of such steels takes place at relatively long austenization times, see for example the continuous cooling transformation (CCT) depicted in FIG. 1 and the temperature time transformation (TTT) depicted in FIG. 2. Applicants have used such TTT and CCT diagrams to refer to the cooling practice used to cool down a subject steel after austenization. The cooling can be continuous, or it can be rapid to a certain temperature and then held at a temperature between 600 and 700° C. for the pearlitic transformation to occur. Once the pearlitic transformation is completed the components can be cooled down at low or high temperatures. After the steel is pearlitic, it can be either slowly cooled or quenched. In either case, the resulting pearlitic microstructure will remain the same.

Figure 2:
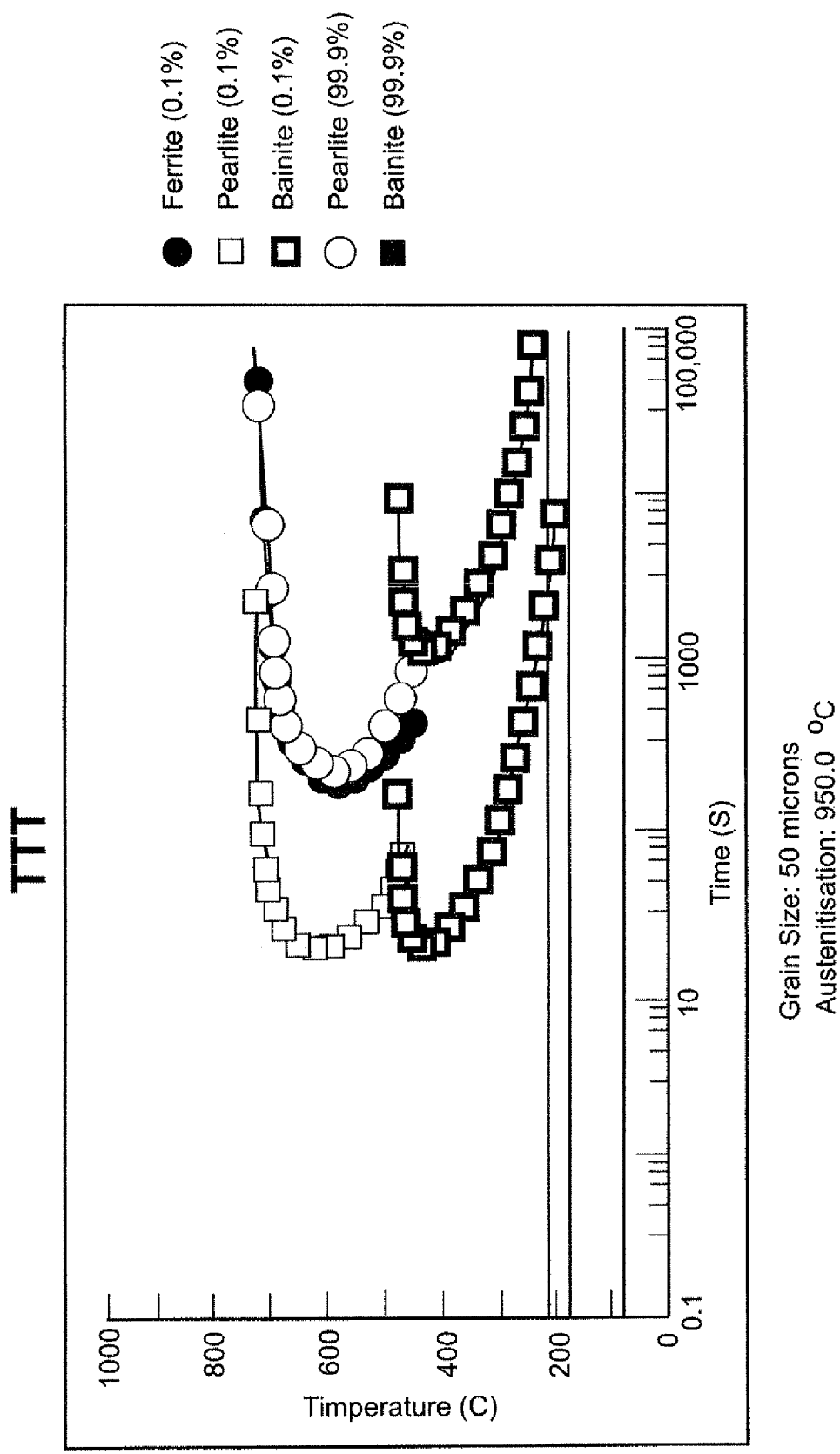
FIG. 2 is a temperature time transformation (TTT) diagram for a representative steel of this patent disclosure.

Applicants have also found that for practical considerations 950° C. is the optimum austenitic temperature and favor holding the subject steels at that temperature for time periods indicated in FIG. 1 and FIG. 2 that are usually longer than 1000 seconds to ensure proper heat treatment conditions. Those skilled in this art also will appreciate that railroad wheel slidings are usually sudden processes that reach high temperatures—but for only short time periods. Therefore, Applicants' use of alloying elements that serve to retain an austenite phase, such as niobium, plays a key role in the railroad steels of this patent disclosure since they serve to prevent the formation of martensite and thus spalling. In addition, among other things, Applicants' data show that the austenite stabilizers prevent martensite formation by a decrease in the start martensite transformation temperature. In comparing a Class C steel and SRI-AAR (Strategy Research Initiative-American Association of Railroads) steel, it can be seen that the start martensite transformation temperature was lowered from about 365° C. to about 198° C. and thereby helping prevent the formation of martensite. Again, the above temperatures can be observed in FIG. 1 and FIG. 2 as well as the regions where the various phases in which this steel can be transformed for the particular times or cooling rates. Applicants have confirmed these temperatures by thermal analysis.

Applicants also have found that heat treatments conducted at 950° C. or higher for more than 1000 seconds of austenization as well as the use of the cooling rates shown in FIG. 1 serve to transform the microstructure of the representative steel to pearlite. Any sudden heating of this steel to temperatures above 950° C. can create austenite. However, during the cooling process the niobium component of such steels serves particularly well in forcing retention of the austenite phase and thereby preventing formation of a martensite phase independently of the cooling rate conditions. This circumstance will result in the prevention of spalling, which of course is also a major goal in the development of any steel used as a railroad component.

Each of Applicants' two railroad wheel steels will preferably have Brinell hardness levels ranging between about 363 and about 400. Preferably, Applicants' steels will meet or exceed certain characteristics of AAR Grade C railroad wheel steel. For example, AAR Grade C steels have the following properties:

| | |
|---|---|
| Hardness = | 421-463 HB (Hardness Brinell) |
| Tensil Strength = | 110 ksi (kilopounds/square inch) |
| Yield Strength = | 160 ksi (kilopounds/square inch) |
| Fracture Toughness = | 35 ksi sqrt (in) (kilopounds square root of surface area in inches) |

An added plus for Applicants' steels is their ability to be made with substantially the same manufacturing processes used to make various prior art railroad wheel steels. Moreover, the relative cost of Applicants' wheel steels remains competitive—especially given their improved rolling contact fatigue resistance qualities.

Those skilled in the steel railroad wheel making arts will also appreciate that, while this invention has been described in detail and with reference to certain specific embodiments thereof various changes and modifications can be made therein without departing from the spirit and scope of this patent disclosure.

Thus, having disclosed our invention, what is claimed is:

1. A railroad wheel steel having a pearlitic structure is comprised of:
   0.65 to 0.80 wt. % carbon;
   0.80 to 1.00 wt. % silicon;
   0.85 to 1.15 wt. % manganese;
   0.005 to 0.030 wt. % phosphorous;
   0.10 to 0.25 wt. % chromium;
   0.01 to 0.12 wt. % niobium;
   0.050 to 0.150 wt. % nickel;
   0.20 to 0.30 wt. % molybdenum;
   0.10 to 0.30 wt. % vanadium;
   0.005 to 0.040 wt. % sulfur
with the balance being iron and incidental impurities.

2. The railroad wheel steel of claim 1 having a Brinell hardness between 363 and 400.

3. A railroad wheel made of a steel having a pearlitic structure is comprised of:
   0.65 to 0.80 wt. % carbon;
   0.80 to 1.00 wt. % silicon;
   0.85 to 1.15 wt. % manganese;
   0.005 to 0.030 wt. % phosphorous;
   0.10 to 0.25 wt. % chromium;
   0.01 to 0.12 wt. % niobium;
   0.050 to 0.150 wt. % nickel;
   0.20 to 0.30 wt. % molybdenum;
   0.10 to 0.30 wt. % vanadium;
   0.005 to 0.040 wt. % sulfur;
with the balance being iron and incidental impurities.

4. The railroad wheel of claim 3 having a Brinell hardness between 363 and 400.

\* \* \* \* \*